Sept. 14, 1965  V. V. ELKINS, JR  3,206,344

METHOD OF BONDING A COPOLYMER FILM TO METAL

Filed Jan. 26, 1962

INVENTOR
VANCE VERNON ELKINS, JR.

BY

ATTORNEY

United States Patent Office 3,206,344
Patented Sept. 14, 1965

3,206,344
METHOD OF BONDING A COPOLYMER FILM TO METAL
Vance Vernon Elkins, Jr., Wilmington, Del., assignor to E. I. du Pont de Nemours and Company, Wilmington, Del., a corporation of Delaware
Filed Jan. 26, 1962, Ser. No. 169,123
5 Claims. (Cl. 156—86)

This invention relates to a process for bonding a film of a copolymer of hexafluoropropylene and tetrafluoroethylene to metal.

Functional rolls used in the continuous processing of films, etc., require a covering over the metal roll surface which has a smooth, continuous, corrosion-resistant plastic surface with excellent anti-sticking properties and which must be adequately bonded to the metal surface.

A particularly desirable polymeric material for such a covering comprises copolymers of hexafluoropropylene and tetrafluoroethylene which contain from 5 to 50 percent hexafluoropropylene and 95 to 50 percent tetrafluoroethylene, based on the weight of the copolymer. However, this polymeric material does not bond readily to a metal surface.

It is an object of this invention to provide a process for bonding a film of a copolymer of hexafluoropropylene and tetrafluoroethylene to metal. A further object of this invention is to provide a copolymeric film covering of hexafluoropropylene and tetrafluoroethylene for a metal roll surface in which the covering is firmly bonded to the metal roll surface and which is smooth, corrosion-resistant and has anti-sticking properties. These and other objects will appear hereinafter.

Figure 1:
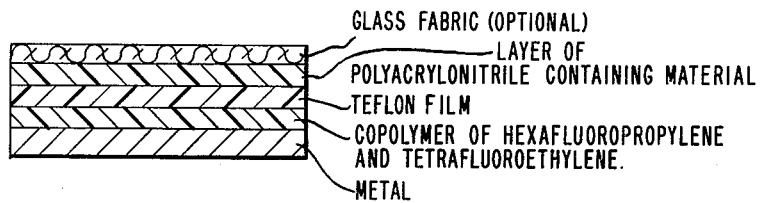

FIG. 1, a cross-sectional view of a metal surface covered with the copolymer film and overlaid with removable layers of polymeric tape and woven glass fabric.

Figure 2:

FIG. 2, a cross-sectional view of the metal surface with the copolymer film bonded thereto.

These and other objects are accomplished by the process of this invention comprising heat or chemically cleaning the metal surface, particularly a metal roll surface; covering the metal surface with at least one layer of a film of a copolymer of hexafluoropropylene and tetrafluoroethylene so as to give the desired thickness; covering the copolymer film covering with a layer of polytetrafluoroethylene film; covering the polytetrafluoroethylene film layer with a material containing an acrylonitrile polymer; optionally, covering the layer of material containing an acrylonitrile polymer with woven glass fabric; heating the covered metal surface to at least the melt temperature of the copolymer film but below the melt temperature of the polytetrafluoroethylene film; cooling the covered metal surface and then removing the woven glass fabric, if used, the layer of material which contained the acrylonitrile polymer and the polytetrafluoroethylene film layer.

Although any metal surface can be utilized in the bonding process of the present invention, reference will be made hereinafter to a metal roll surface, as a roll or pipe surface constitutes the preferred surface to which the copolymer film is bonded. Preferred metals include iron, steel, copper, aluminum, etc. as well as alloys of these metals commonly known in the art.

Pretreating or cleaning the metal roll surface is necessary for proper adhesion of the copolymer film layer. Any metal cleaning materials or conditions can be used such as zinc phosphate, iron phosphate, a 10 percent solution of phosphoric acid, and the like. Instead of these materials, the metal roll surface can be heated at about 600° F. for two hours before applying the copolymer film.

The copolymer film can be either spirally wrapped on the roll with butt joints or with a 50 percent overlap. One layer may be sufficient; however, several layers can be wrapped around the roll until the desired thickness is reached. Short length metal rolls can be convolutely wound to the desired thickness of the copolymer film is the same width.

The polytetrafluoroethylene tape layer that is applied over the copolymer film is preferably skived and prestretched between 25 and 150 percent, preferably about 50 percent, so that when the wrapped assembly is heated, the tape will shrink firmly against the copolymer wrap, pressing the molten copolymer against the metal roll surface.

The layer of material containing an acrylonitrile polymer that is applied next preferably comprises a polyethylene terephthalate base pressure-sensitive adhesive tape having a pressure-sensitive adhesive coating and an intermediate anchoring coating comprising an acrylonitrile-containing polymer. Such materials would include butadiene-acrylonitrile copolymer ("Hycar" #1042), butadiene-acrylonitrile copolymer ("Hycar" OR-15), butadiene-acrylonitrile copolymer ("Hycar" OR-25), all manufactured by the B. F. Goodrich Chemical Co. Typical pressure-sensitive tapes applicable in the process of this invention are disclosed in Bohaty, U.S. Patent 2,878,142.

Optionally, woven glass tape is the next layer wrapped onto the assembly and it is fastened in place with a piece of the same pressure-sensitive tape as described above. Any typical woven glass tapes can be used. This wrap is not essential to the invention but it does serve to give additional restraint to the other wraps.

The polytetrafluoroethylene tape, pressure-sensitive adhesive tape and woven glass tape are preferably wrapped onto the assembly with a 50 percent spirally lapped wrap; however, the type wrapping used in applying these tapes in their appropriate order is not critical as long as there is a complete covering of each successive layer.

The invention can be further understood by referring to the following examples.

*Example 1*

In this example, a sandblasted, schedule 80 steel pipe of 6½ inches O.D. and approximately 0.43 inch wall thickness is used. After wiping the roll free of dust, the roll (pipe) surface is treated with a 10 percent phosphoric acid solution at 140° F. for 5 minutes and then washed and dried at approximately 120° F.

A 1 inch wide, 0.010 inch thick, strip of copolymer film made from a high molecular weight copolymer comprising approximately 85 percent tetrafluoroethylene and 15 percent hexafluoropropylene is spirally butt wrapped over the full length of the roll (piece of pipe), from one end to the other, back and forth, until a thickness of approximately 60 mils is built up. This built-up layer of copolymer film is then completely covered with a 50 percent spirally lapped wrap of 1 inch wide, 50 percent stretched, 5 mil polytetrafluoroethylene skived tape. Next, the skived polytetrafluoroethylene tape layer is completely covered with a 50 percent spirally lapped wrap of a polyethylene terephthalate film base pressure-sensitive adhesive tape, approximately 3 mils thick, having an intermediate anchoring coating comprising an acrylonitrile-containing polymer. Such a pressure-sensitive tape is described in Bohaty, U.S. Patent 2,878,142.

The pressure-sensitive adhesive tape layer is then covered with two 50 percent spirally lapped wraps of 1 inch wide, 3 mils woven glass tape and fastened at the end with a piece of the pressure-sensitive adhesive tape described above.

The wrapped cylinder is then placed in a forced draft oven at 500° F. for 1 hour and rotated 180° at the half hour to insure uniform heating. The oven temperature is then raised to 580° F. (above the melting point of the copolymer which ranges from 545 to 563° F.), rotating the cylinder 180° every half hour for two hours. It is then removed from the oven and quenched in room temperature water.

The outer wraps are removed from the cylinder after it has been cooled to room temperature, exposing the fused copolymer film coating firmly bonded to the steel cylinder, as a result of the permeation of acrylonitrile vapor from the acrylonitrile-containing polymer through the copolymer film layer.

The coated cylinder is then mounted in a lathe and the copolymer film surface machined smooth under the following conditions:

(1) Lathe speed—475 r.p.m.
(2) Cutting speed—450 f.p.m.
(3) Feed—0.005 inch.
(4) Cutting tool—front rake angle 18°–22°.
(5) Cutting tool—side rake angle 10°–12°.
(6) Depth of cut—0.10 inch.

The machined surface is then given a high polish.

The bond is not affected by thermal cycling from −20° F. to 350° F., showing no evidence of stress cracking or delamination after ten one-half hour cycles at each temperature.

*Example II*

A steel pipe of the same specifications and dimensions as in Example I and treated in the same manner was wrapped with approximately the same thickness of the same copolymer films and then with a strip of the same stretched polytetrafluoroethylene skived tape. Next, the skived polytetrafluoroethylene tape layer was completely covered with a layer of polyethylene terephthalate film 0.005 inch thick having a coating of a butadiene-acrylonitrile copolymer ("Hycar #1042 rubber, manufactured by the B. F. Goodrich Chemical Co.) approximately 0.0002 inch thick on the side next to the tape layer. The film was fastened in place with copper wire.

The wrapped cylinder was heated for three hours at 572° F. and then cooled. The polyethylene terephthalate film had melted but the acrylonitrile in the butadiene-acrylonitrile copolymer had vaporized and penetrated through to the steel roll to give a firm bonding of the copolymer film to the steel.

When polyethylene terephthalate film without any butadiene-acrylonitrile rubber coating was used, only a slight bonding occurred between the copolymer film and the steel rolls.

*Example III*

Another steel pipe treated in the same manner as in Example I and wrapped with approximately the same thickness of the same copolymer film and then with a strip of stretched polytetrafluoroethylene skived tape was completely covered with a layer of polyacrylonitrile film 0.001 inch thick which was also held in place with copper wire.

The wrapped cylinder was heated in an oven for three hours at 572° F. and then cooled. Upon removing the outer wrap the copolymer film was found to be firmly bonded to the steel surface. In other words, some of the polyacrylonitrile had broken down and acrylonitrile vapor had penetrated through the copolymer film layer.

This invention makes it possible to firmly bond a smooth, corrosion-resistant covering of a copolymer of hexafluoropropylene and tetrafluoroethylene which has excellent anti-sticking properties to a metal roll surface.

What is claimed is:

1. A process for bonding a film of a copolymer of hexafluoropropylene and tetrafluoroethylene to a metal surface comprising: cleaning said metal surface; covering said metal surface with at least one layer of said copolymer film; covering said copolymer film covering with a layer of polytetrafluoroethylene film; covering said polytetrafluoroethylene film layer with a layer of a material containing an acrylonitrile polymer; heating the covered metal surface to at least the melt temperature of said copolymer film but below the melt temperature of the polytetrafluoroethylene film; cooling the covered metal surface and removing the acrylonitrile containing material and the polytetrafluoroethylene film layer.

2. The process of claim 1 wherein the copolymer film of hexafluoropropylene and tetrafluoroethylene contains from 5 to 50 percent hexafluoropropylene and from 95 to 50 percent tetrafluoroethylene, based on the weight of the copolymer.

3. The process of claim 1 wherein the metal surface is a metal roll surface.

4. The process of claim 1 wherein the acrylonitrile polymer containing material layer is covered with woven glass fabric.

5. A process for bonding a film of a copolymer comprising 85 percent tetrafluoroethylene and 15 percent hexafluoropropylene to a steel roll surface comprising: cleaning said roll surface with a 10 percent phosphoric acid solution; wrapping said roll surface with several layers of said copolymer film; wrapping said copolymer film wrap with a layer of 50 percent stretched polytetrafluoroethylene skived tape; wrapping said polytetrafluoroethylene skived tape layer with a polyethylene terephthalate backed pressure-sensitive adhesive tape the adhesive comprising an acrylonitrile polymer; wrapping said pressure-sensitive tape layer with woven glass tape which is fastened in place; heating the wrapped steel roll surface at a temperature of about 580° F.; cooling the wrapped steel roll surface to about room temperature and removing the woven glass tape, pressure-sensitive tape and polytetrafluoroethylene tape layers.

References Cited by the Examiner

UNITED STATES PATENTS

| | | |
|---|---|---|
| 2,783,173 | 2/57 | Walker et al. |
| 2,833,686 | 5/58 | Sandt. |
| 2,871,144 | 1/59 | Doban. |
| 2,941,911 | 6/60 | Kumnick et al. |
| 2,989,433 | 6/61 | Yuan. |
| 2,992,957 | 7/61 | Maxey. |
| 3,031,364 | 4/62 | Perkine _____ 156—308 |

EARL M. BERGERT, *Primary Examiner.*